(12) United States Patent
Ohnishi et al.

(10) Patent No.: US 11,829,532 B2
(45) Date of Patent: *Nov. 28, 2023

(54) CONTROL DEVICE, CONTROL METHOD, AND PROGRAM

(71) Applicant: KABUSHIKI KAISHA TOKAI RIKA DENKI SEISAKUSHO, Aichi (JP)

(72) Inventors: Takeshi Ohnishi, Aichi (JP); Fumiaki Hirose, Aichi (JP); Yuma Nakai, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/640,497

(22) PCT Filed: Apr. 17, 2020

(86) PCT No.: PCT/JP2020/016827
§ 371 (c)(1),
(2) Date: Mar. 4, 2022

(87) PCT Pub. No.: WO2021/049083
PCT Pub. Date: Mar. 18, 2021

(65) Prior Publication Data
US 2022/0350406 A1 Nov. 3, 2022

(30) Foreign Application Priority Data
Sep. 10, 2019 (JP) .................. 2019-164228

(51) Int. Cl.
*G06F 3/01* (2006.01)
*G06F 3/16* (2006.01)

(52) U.S. Cl.
CPC .............. *G06F 3/016* (2013.01); *G06F 3/165* (2013.01)

(58) Field of Classification Search
CPC ........ G06F 3/016; G06F 3/165; G06F 3/0488; A63F 13/285
See application file for complete search history.

(56) References Cited

U.S. PATENT DOCUMENTS

| 2014/0210756 | A1* | 7/2014 | Lee ..................... G06F 3/03545 345/173 |
| 2016/0246374 | A1* | 8/2016 | Carter ..................... G06F 3/167 |
| 2019/0243450 | A1* | 8/2019 | Boulanger ............ G06F 3/0488 |

FOREIGN PATENT DOCUMENTS

| JP | 2018-036818 | 3/2018 |
| JP | 2018-507485 | 3/2018 |
| WO | 2018/018003 | 1/2018 |

OTHER PUBLICATIONS

International Search Report issued in International Bureau of WIPO Patent Application No. PCT/JP2020/016827, dated Jul. 7, 2020, along with an English translation thereof.
(Continued)

*Primary Examiner* — Quan Zhen Wang
*Assistant Examiner* — Mancil Littlejohn, Jr.
(74) *Attorney, Agent, or Firm* — GREENBLUM & BERNSTEIN P.L.C.

(57) ABSTRACT

There is provided a control device including a control unit that controls tactile sense presentation for presenting a stimulation through a tactile sense and hearing sense presentation for presenting a stimulation through a hearing sense, when it is determined that an operation has been performed on an input unit including a contact area with which an object is brought into contact. The control unit controls displacement indicating a difference from a reference position of the contact area, the displacement being related to the tactile sense presentation, and a strength of sound related to the hearing sense presentation, so that at least one of the tactile sense presentation and the hearing (Continued)

sense presentation is in a proper range that is a range allowing a user of the input unit to perceive the presentation and not causing the user to have unpleasant feeling.

5 Claims, 3 Drawing Sheets

(56) References Cited

OTHER PUBLICATIONS

Written Opinion issued in International Bureau of WIPO Patent Application No. PCT/JP2020/016827, dated Jul. 7, 2020.

* cited by examiner

CONTROL DEVICE, CONTROL METHOD, AND PROGRAM

TECHNICAL FIELD

The present invention relates to a control device, a control method, and a program.

BACKGROUND ART

Recently, there have been developed various devices that output feedbacks to users' operations. Among the above-described devices, there exist devices that use, as a feedback, presentation of a stimulation to five senses of users. For example, Patent Literature 1 discloses a device that outputs a feedback using vibrations and sound in response to user's operation on the operation surface.

CITATION LIST

Patent Literature

Patent Literature 1: Japanese Patent Application Laid-open No. 2018-36818

SUMMARY OF INVENTION

Technical Problem

As disclosed in Patent Literature 1, when a feedback using a sense stimulation is output in response to user's operation, it is important to securely allow a user to perceive the feedback and perform a control to prevent the feedback from being a disadvantage for the user.

Then, in view of the above-described problem, the present invention aims at providing a mechanism that is capable of achieving a feedback further improving the operability.

Solution to Problem

In order to solve the above-described problem, an aspect of the present invention provides a control device including a control unit that controls tactile sense presentation for presenting a stimulation through a tactile sense and hearing sense presentation for presenting a stimulation through a hearing sense, when it is determined that an operation has been performed on an input unit including a contact area with which an object is brought into contact, in which the control unit controls displacement indicating a difference from a reference position of the contact area, the displacement being related to the tactile sense presentation, and controls a strength of sound related to the hearing sense presentation, so that at least one of the tactile sense presentation and the hearing sense presentation is in a proper range that is a range allowing a user of the input unit to perceive the presentation and not causing the user to have unpleasant feeling.

Moreover, in order to solve the above-described problem, another aspect of the present invention provides a control method including controlling tactile sense presentation for presenting a stimulation through a tactile sense and hearing sense presentation for presenting a stimulation through a hearing sense, when it is determined that an operation has been performed on an input unit including a contact area with which an object is brought into contact, in which the controlling further includes controlling displacement indicating a difference from a reference position of the contact area, the displacement being related to the tactile sense presentation, and controlling a strength of sound related to the hearing sense presentation, so that at least one of the tactile sense presentation and the hearing sense presentation is in a proper range that is a range allowing a user of the input unit to perceive the presentation and not causing the user to have unpleasant feeling.

Moreover, in order to solve the above-described problem, another aspect of the present invention provides a program, controlling a computer to achieve a control function that controls tactile sense presentation for presenting a stimulation through a tactile sense and hearing sense presentation for presenting a stimulation through a hearing sense, when it is determined that an operation has been performed on an input unit including a contact area with which an object is brought into contact, in which control function is controlled to control displacement indicating a difference from a reference position of the contact area, the displacement being related to the tactile sense presentation, and to control a strength of sound related to the hearing sense presentation, so that at least one of the tactile sense presentation and the hearing sense presentation is in a proper range that is a range allowing a user of the input unit to perceive the presentation and not causing the user to have unpleasant feeling.

Advantageous Effects of Invention

As described above, the present invention provides a mechanism that is capable of achieving a feedback further improving the operability

DESCRIPTION OF EMBODIMENTS

Hereinafter, referring to the appended drawings, preferred embodiments of the present invention will be described in detail. It should be noted that, in this specification and the appended drawings, structural elements that have substantially the same function and structure are denoted with the same reference signs, and repeated explanation thereof is omitted.

1. Embodiment

1.1. Configuration Example

Figure 1:
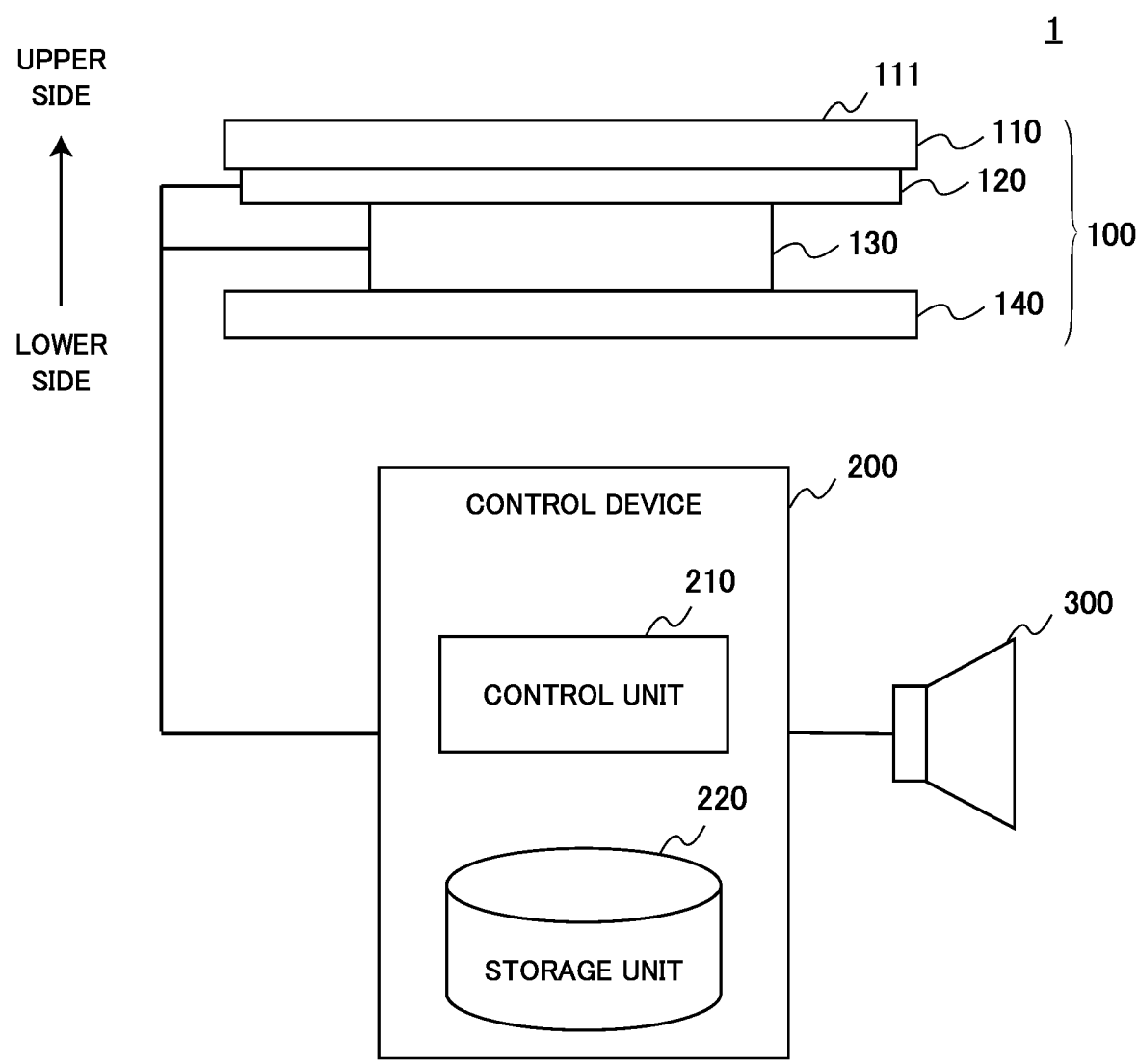
FIG. 1 is a diagram illustrating a configuration example of a system 1 according to an embodiment of the present invention.

FIG. 1 is a diagram illustrating a configuration example of the system 1 according to an embodiment of the present invention. As illustrated in FIG. 1, the system 1 of the embodiment may include an input device 100, a control device 200, and a sound output device 300.

(Input Device 100)

The input device 100 of the embodiment detects user's input operation on the system 1, and outputs information related to the input operation to the control device 200. Moreover, on the basis of control signals output by the control device 200, the input device 100 of the embodiment performs tactile sense presentation for presenting a stimulation through the tactile sense of the user having performed the above-described input operation.

The input device 100 of the embodiment may include, for example, an input unit 110, a detection unit 120, a tactile sense presentation unit 130, and a supporting part 140, as illustrated in FIG. 1.

The input unit 110 of the embodiment is a component for user's input operation, and includes a contact area 111 where an object contacts at an input operation. Here, the above-described object may be, for example, a part of user's body such as a finger, a pen-shaped tool held by a user, or the like. The user performs a pressing operation or a tracing operation on the contact area 111 using a finger, the above-described tool, or the like, thereby inputting various kinds of orders to the system 1. The input unit 110 of the embodiment may be, for example, various kinds of touch panels.

The detection unit 120 of the embodiment detects contact of an object on the contact area 111 of the input unit 110, and outputs information related to the contact of the object to the control device 200. The detection unit 120 of the embodiment may be, for example, a pressure sensor that converts a change of a pressure changed with user's input operation on the contact area 111 into electric signals. Moreover, the detection unit 120 may be an electrostatic capacity sensor that converts a change of electrostatic capacity changed with user's input operation on the contact area 111 into electric signals.

The tactile sense presentation unit 130 of the embodiment is a component for presenting a stimulation through the tactile sense of a user. When the detection unit 120 has detected contact of an object on the contact area 111 of the input unit 110, that is, when it is determined that an operation on the input 110 has been performed, for example, the tactile sense presentation unit 130 of the embodiment may perform tactile sense presentation on the basis of control signals output by the control device 200.

The tactile sense presentation unit 130 of the embodiment may perform tactile sense presentation using vibration stimulations, for example. In this case, the tactile sense presentation unit 130 may be various kinds of actuators such as an eccentric rotating mass (ERM), a linear resonant actuator (LRA), or a piezo (electric) element.

Meanwhile, the tactile sense presentation unit 130 of the embodiment may be configured to perform tactile sense presentation causing a temperature change, tactile sense presentation related to a force sense (presentation of sense of being pushed by an object, presentation of sense of touching an object, or presentation of sense of being tightened, for example), or perform tactile sense presentation related to cutaneous sensation (presentation of rough feeling or presentation of smooth feeling, for example). The tactile sense presentation unit 130 of the embodiment may have various configurations in accordance with the characteristics of tactile sense presentation to be presented.

The supporting part 140 of the embodiment is a component for supporting the input unit 110, the detection unit 120, and the tactile sense presentation unit 130. The supporting part 140 of the embodiment is formed of a material with a shape in accordance with the specifications of the system 1.

(Control Device 200)

The control device 200 according to the embodiment controls operations of the input device 100 and the sound output device 300. The control device 200 of the embodiment may include a control unit 210 and a storage unit 220, as illustrated in FIG. 1.

When the detection unit 120 determines that an object has contacted the contact area 111 of the input unit 110, or when it is determined that a predetermined input operation has been performed on the basis of electric signals output from the detection unit 120, the control unit 210 of the embodiment controls tactile sense presentation by the tactile sense presentation unit 130 and hearing sense presentation by the sound output device 300 that is presentation of a stimulation through user's hearing sense. Here, the control unit 210 of the embodiment is characterized in controlling the displacement indicating a difference from a reference position of the contact area 111, the displacement being related to the tactile sense presentation, and the strength of sound related to the hearing sense presentation, so that at least one of the tactile sense presentation and the hearing sense presentation is in a proper range that is a range allowing a user to perceive presentation and not causing the user to have unpleasant feeling. The function of the control unit 210 is formed by, for example, an electronic circuit such as a central processing unit (CPU) and a microprocessor. The details of the function of the control unit 210 of the embodiment will be separately described.

The storage unit 220 of the embodiment stores various kinds of information related to the operations of the input device 100, the control device 200, and the sound output device 300. The storage unit 220 stores information and the like for defining the form of tactile sense presentation to be output by the input device 100 and the form of hearing sense presentation to be output by the sound output device 300, for example.

(Sound Output Device 300)

The sound output device 300 of the embodiment performs hearing sense presentation on the basis of control signals output by the control device 200. The sound output device 300 of the embodiment may be a speaker, for example.

The above has described the configuration example of the system 1 of the embodiment. Note that the configuration described above using FIG. 1 is merely an example and the configuration of the system 1 of the embodiment is not limited thereto. For example, the functions of the input device 100, the control device 200, and the sound output device 300 of the embodiment may be achieved by a single device. The configuration of the system 1 of the embodiment can be modified flexibly depending on the specifications and uses.

1.2. Details

The following will specifically describe the controls of tactile sense presentation and hearing sense presentation according to the embodiment. For example, the control unit 210 of the embodiment controls the tactile sense presentation unit 130 to output tactile sense presentation, and controls the sound output device 300 to output hearing sense presentation in synchronization with the tactile sense presentation, as a feedback to user's input operation on the input unit 110. In this manner, with the tactile sense presentation and the hearing sense presentation performed synchronously, a user is able to grasp more clearly that the input operation performed by the user has been recognized by the system 1, as compared with the case where only one of the tactile sense presentation and the hearing sense presentation is performed.

Meanwhile, even when the tactile sense presentation and the hearing sense presentation are performed synchronously, it is assumed that feeling perceived by users and impression conceived by users differ depending on a form of each presentation.

For example, in a case where the strength of sense presentation is excessively large such as when the vibration used for tactile sense presentation is excessively strong and when the sound used for hearing sense presentation is excessively large, the user may have unpleasant feeling about the feedback. On the other hand, in a case where the strength of sense presentation is excessively small such as when the vibration used for tactile sense presentation is excessively small and when the sound used for hearing sense presentation is excessively small, it is assumed that the user is not able to perceive the feedback.

In order to avoid such cases, it is important to define, with high accuracy, the proper range that is a range allowing a user to perceive at least one of the tactile sense presentation and the hearing sense presentation and not causing the user to have unpleasant feeling, and to control the tactile sense presentation and the hearing sense presentation in accordance with the proper range. Furthermore, when each of the tactile sense presentation and the hearing sense presentation is controlled to be within the above-described proper range, it is possible to achieve a feedback further improving the operability.

In order to define the above-described proper range, the applicants of the present application conducted an experiment by focusing on the displacement indicating a difference from a reference position that is related to the tactile sense presentation (hereinafter, also simply referred to as displacement) and on the strength of sound related to the hearing sense presentation. Here, the above-described displacement is an example of an index indicating the strength of tactile sense presentation. For example, when a vibration stimulation is used for tactile sense presentation, the above-described displacement may be displacement indicating a difference from a reference position of the contact area 111, the displacement being caused by vibrations of the tactile sense presentation unit 130. Moreover, the above-described displacement may be displacement indicating a difference from a reference position of the input unit 110 or displacement indicating a difference from a reference position of the tactile sense presentation unit 130, the displacement being caused by vibrations of the tactile sense presentation unit 130.

Figure 2:
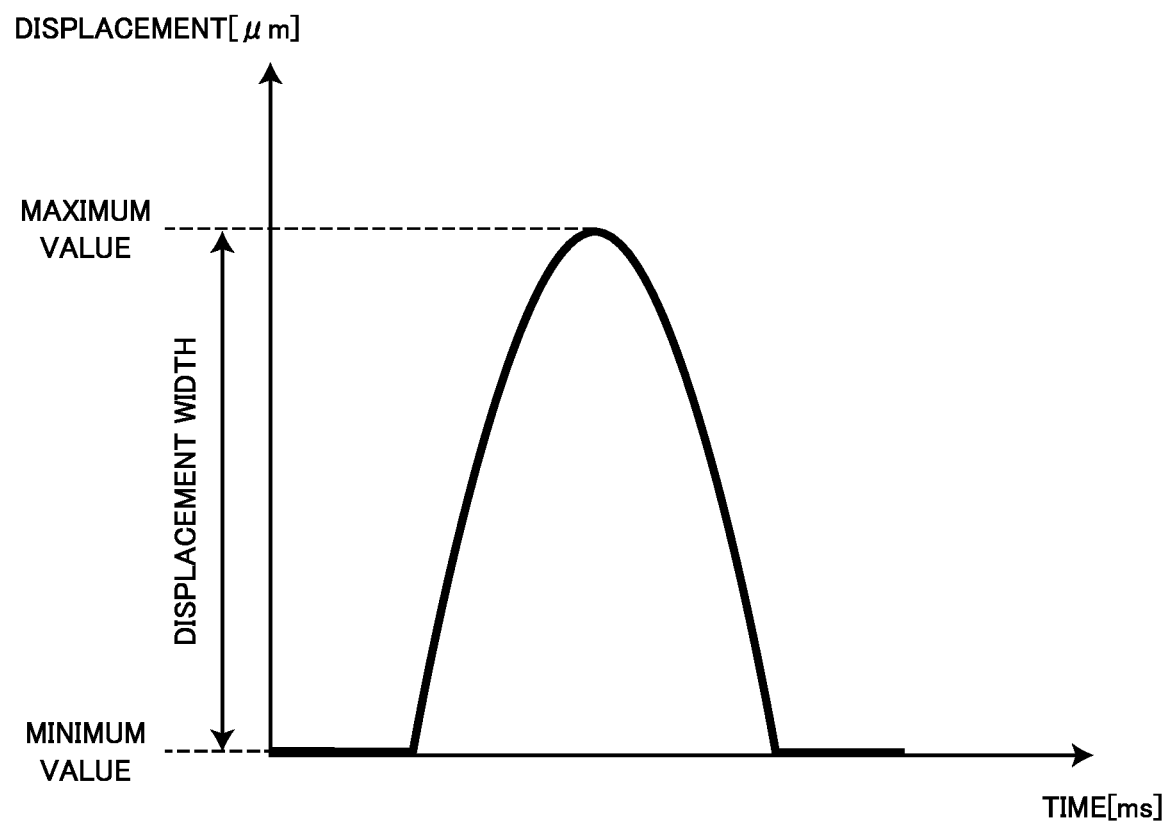
FIG. 2 is a diagram for explaining the displacement of a contact area 111 according to the embodiment.

FIG. 2 is a diagram for explaining the displacement of the contact area 111 according to the embodiment. FIG. 2 illustrates, along a time axis, the displacement of the contact area 111 after current is applied on the tactile sense presentation unit 130. Note that the transition in one cycle of displacement is illustrated here. When current is applied on the tactile sense presentation unit 130 generating vibrations, the displacement increases sharply after a given period of time has elapsed, reaches a maximum value, and then decreases, as illustrated in FIG. 2. Here, the displacement of tactile sense presentation according to the embodiment may be a difference (displacement width) between the maximum value of displacement caused by application of current on the tactile sense presentation unit 130 and a reference position. The control unit 210 of the embodiment controls the tactile sense presentation unit 130 so that the difference between the maximum value of displacement and a reference position (displacement width) is within the above-described proper range. Note that the above-described reference position may be a minimum value of displacement or zero. Moreover, the reference position may be a value of displacement before current is applied on the tactile sense presentation unit 130.

Meanwhile, the strength of sound related to hearing sense presentation may be a sound pressure level [dB] expressing the magnitude of a sound pressure by a common logarithm of a ratio to a defined value, or a loudness [sone] that is the strength of sound perceived by person's hearing sense and is one of the sensing amount.

Note that in the experiment, a vibration stimulation was used for the tactile sense presentation, and the displacement related to the tactile sense presentation was defined as a difference (displacement width) between the maximum value of an acceleration and a reference position, for example, so as to define a plurality of tactile sense presentation with different displacement. Moreover, the strength of sound related to the hearing sense presentation was defined as a sound pressure level, so as to define a plurality of hearing sense presentation with different strengths of sound.

Moreover, in the experiment, all combinations of tactile sense presentation and hearing sense presentation defined in the above-described manner were presented as feedbacks to a plurality of subjects who operate the input unit 110 during driving using a vehicle driving simulator, and the subjects were asked to subjectively evaluate the strong feeling of the feedbacks, the easiness to understand the feedbacks, and the appropriateness of the feedbacks as a general viewpoint.

As a result of the above-described experiment, it was confirmed, regarding the strong feeling of the feedbacks, that the strong feeling of the feedbacks is increased as the displacement related to the tactile sense presentation is larger or as the strength of sound related to the hearing sense presentation is larger. Moreover, it was confirmed that when the displacement related to the tactile sense presentation or the strength of sound related to the hearing sense presentation is larger than a given level, the evaluations about the feedbacks by the subjects tend to be "unpleasant".

Moreover, it was confirmed, regarding the easiness to understand the feedbacks, that the easiness to understand the feedbacks is deteriorated as the displacement related to the tactile sense presentation is smaller or as the strength of sound related to the hearing sense presentation is smaller.

Furthermore, it was confirmed, regarding the appropriateness of the feedbacks as a general viewpoint, that the appropriateness of the feedbacks is deteriorated when the displacement related to the tactile sense presentation or the strength of sound related to the hearing sense presentation is a given level or larger or a given level or smaller. It is supposed that this result is due to a fact that as the displacement related to the tactile sense presentation or the strength of sound related to the hearing sense presentation is increased, the strong feeling of the feedbacks approaches an unpleasant level, and as the displacement related to the tactile sense presentation or the strength of sound related to the hearing sense presentation is decreased, the easiness to understand the feedbacks is deteriorated.

The applicants of the present application performed a multivariate analysis based on the above-described evaluations by the subjects, so as to define the above-described proper range with higher accuracy. The multivariate analysis is a general term of analysis operations such as integral summarization of a large kinds of mutually related data obtained from a certain target. Here, a multiple regression analysis was performed with the evaluations by subjects about the appropriateness of the feedbacks using the tactile sense presentation and the hearing sense presentation based on the above-described definition as objective variables, and the displacement related to the tactile sense presentation and the strength of sound related to the hearing sense presentation as explanation variables. Note that the objective variable was calculated using the following expression (1). The x1 in the expression (1) indicates displacement (displacement width) related to the tactile sense presentation, and the x2 indicates the strength of sound (sound pressure level) related to the hearing sense presentation.

$$\alpha + \beta \times (x_1+c)^2 + d \times (x_2+e)^2 \qquad \text{[Mathematical 1]}$$

Figure 3:
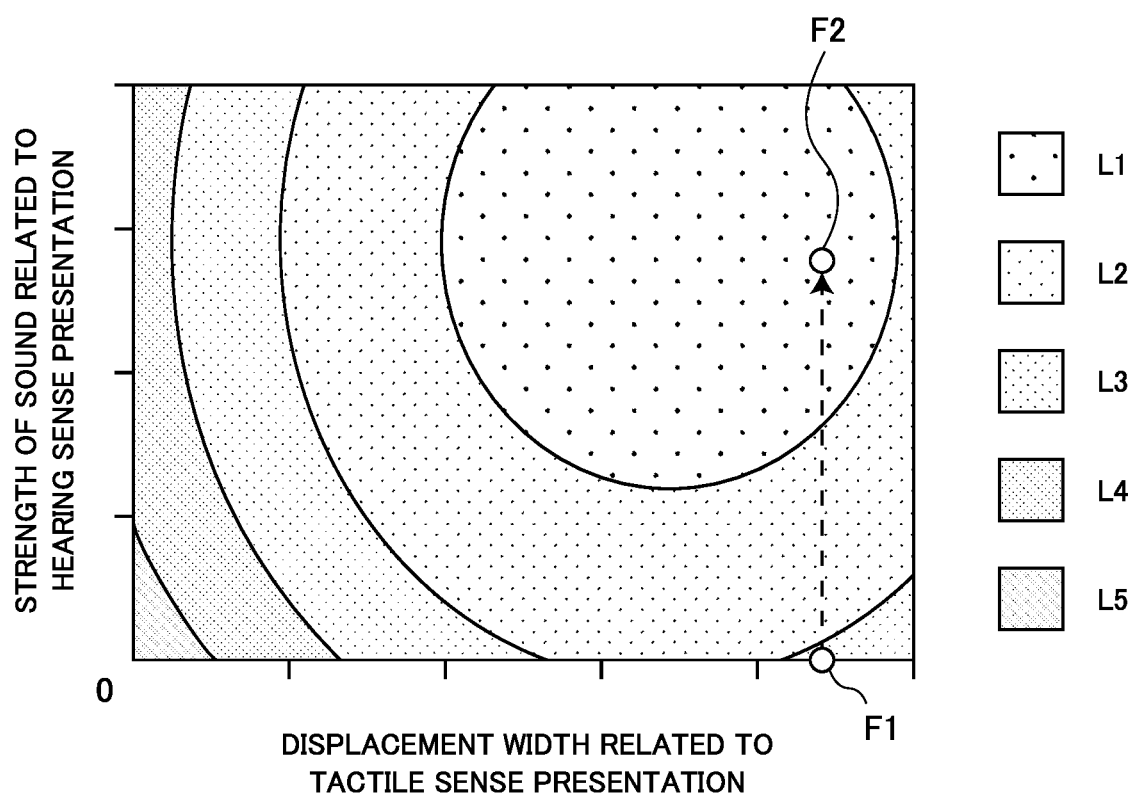
FIG. 3 is a diagram illustrating a map of the relation between an objective variable and an explanation variable that is calculated by a multivariate analysis according to the embodiment.

Moreover, FIG. 3 is a diagram illustrating a map of the relation between an objective variable and an explanation variable that is calculated by the multiple regression analysis. In FIG. 3, the horizontal axis indicates the magnitude of displacement (displacement width) related to the tactile sense presentation, while the vertical axis indicates the strength of sound related to the hearing sense presentation. Furthermore, FIG. 3 illustrates the average of evaluations by subjects with hatching corresponding to each of a plurality of phases. Note that FIG. 3 illustrates a part of the map including the phases L1 to L5 of the plurality of phases.

The phases L1 to L5 indicate that as the numerical value is smaller, the subjects evaluated that the feedbacks were more appropriate. For example, the phase L1 is a range where the subjects evaluated that each of the tactile sense presentation and the hearing sense presentation was pleasant, and the phase L2 is a range where the subjects evaluated that each of the tactile sense presentation and the hearing sense presentation was perceptible and was not unpleasant. Meanwhile, the phase L3 or lower is a range where the subjects evaluated that at least one of the tactile sense presentation and the hearing sense presentation was difficult to understand or impossible to perceive, or that at least one of the tactile sense presentation and the hearing sense presentation was unpleasant. In this case, the control unit 210 of the embodiment may control each value (parameter) so that the displacement related to the tactile sense presentation and the strength of sound related to the hearing sense presentation are within a range of the phase L2 or higher (proper range) on the map. That is, with such a control, it becomes possible to achieve feedbacks that are perceptible and not unpleasant for users.

Moreover, for example, when the feedback F1 using only the tactile sense presentation is performed, the displacement of the tactile sense presentation is excessively large, which may cause users to have unpleasant feeling (phase L3), as illustrated in FIG. 3. However, when the hearing sense presentation is used together, it is possible to improve the evaluations by users to the phase L1, for example, as illustrated with the feedback F2. In this manner, in the system 1 of the embodiment, it is possible to achieve feedbacks that are perceptible and not unpleasant for users by controlling the combination of the displacement related to the tactile sense presentation and the strength of sound related to the hearing sense presentation.

Note that the control unit 210 of the embodiment may control the displacement and the strength of sound such that each of the tactile sense presentation and the hearing sense presentation is within a range allowing users to have pleasant feeling and within a pleasant range that is a part of the above-described proper range. That is, the control unit 210 of the embodiment may perform a control such that the displacement and the strength of sound are within the range of the phase L1 (pleasant range). With such a control, it is possible to achieve feedbacks that are easy to understand and pleasant for users.

Note that it is considered that the above-described feedbacks using tactile sense presentation and hearing sense presentation are particularly effective for feedbacks to users in a mobile body such as a vehicle. For example, when a user performs an operation on the input unit 110 while driving a vehicle or the like, it is assumed that vibrations and various kinds of environmental noise caused by driving occur in the vehicle interior. In such a case, when a feedback using only tactile sense presentation is performed in a situation where vibrations of a mobile body are strong, or when a feedback using only hearing sense presentation is performed in a situation where the environmental noise is large, for example, it is also assumed that the user is not able to perceive the feedback.

Meanwhile, the control unit 210 of the embodiment performs a feedback using both tactile sense presentation and hearing sense presentation based on objective variables calculated by the above-described multivariate analysis, whereby it is possible to achieve a feedback that is perceptible and not unpleasant for users even in the above-described situations. In this manner, the control unit 210 of the embodiment may control outputs of tactile sense presentation and hearing sense presentation in response to an operation on the input unit 110 by a user in a mobile body. Note that although the multiple regression analysis is exemplified as the multivariate analysis in the above-description, the objective variable of the embodiment may be calculated by, for example, a discriminant analysis, a logistics regression analysis, a quantification 1 group, a quantification 2 group, or the like. In addition, the experiment method may be designed in accordance with the characteristics of an adopted multivariate analysis.

2. Supplement

Heretofore, preferred embodiments of the present invention have been described in detail with reference to the appended drawings, but the present invention is not limited thereto. It is obvious that a person skilled in the art can arrive at various alterations and modifications within the scope of the technical ideas defined in the claims, and it should be naturally understood that such alterations and modifications are also encompassed by the technical scope of the present invention.

For example, the above has described, as an example, the case in which a proper range is defined by the multivariate analysis using evaluations about tactile sense presentation and hearing sense presentation as objective variables and the waveform feature amount related to the tactile sense presentation and the waveform feature amount related to the hearing sense presentation are controlled such that each of the tactile sense presentation and the hearing sense presentation is within the proper range. Meanwhile, the proper range of the embodiment may be defined separately for each of the tactile sense presentation and the hearing sense presentation. In this case, the control unit 210 may control the waveform feature amount related to the tactile sense presentation and the waveform feature amount related to the hearing sense presentation such that at least one of the tactile sense presentation and the hearing sense presentation is within the proper range.

For example, the above has described a vibration stimulation as an example of the tactile sense presentation. However, the tactile sense presentation according to the present invention is not limited thereto. The tactile sense presentation of the embodiment may be a tactile sense presentation causing a temperature change or a tactile sense presentation related to a force sense. Even in this case, it is possible to specify a change amount for a proper range by performing the above-described evaluations by subjects and multiple regression analysis.

A sequence of processing by the devices described in this specification may be achieved using any of software, hardware, and the combination of software and hardware. A program forming the software is preliminarily stored in, for example, a recording medium (non-transitory media) provided inside or outside each device. Then, each program is read in a random access memory (RAM) when executed by a computer, and executed by a processor such as a central processing unit (CPU). The above-described recording medium is, for example, a magnetic disk, an optical disk, a magneto-optical disk, a flash memory, or the like. Moreover, the above-described computer program may be distributed through a network, for example, without using any recording medium.

REFERENCE SIGNS LIST 1 system
100 input device
110 input unit
111 contact area
120 detection unit
130 tactile sense presentation unit
140 supporting part
200 control device
210 control unit
220 storage unit
300 sound output device

The invention claimed is:

1. A control device, comprising:
   a controller that controls tactile sense presentation for presenting a stimulation through a tactile sense and hearing sense presentation for presenting a stimulation through a hearing sense, when it is determined that an operation has been performed on an input device including a contact area with which an object is brought into contact,
   wherein the controller controls displacement indicating a difference from a reference position of the contact area, the displacement being related to the tactile sense presentation, and controls a strength of sound related to the hearing sense presentation, so that at least one of the tactile sense presentation and the hearing sense presentation is in a proper range that is a range allowing a user of the input unit to perceive the presentation and not causing the user to have unpleasant feeling, and
   wherein the proper range is defined by a multivariate analysis using evaluations about the tactile sense presentation and the hearing sense presentation as objective variables and the displacement related to the tactile sense presentation and the strength of sound related to the hearing sense presentation as explanation variables.

2. The control device according to claim 1,
   wherein the controller controls the displacement and the strength of sound such that each of the tactile sense presentation and the hearing sense presentation is within a range allowing the user to have pleasant feeling and within a pleasant range that is a part of the proper range.

3. The control device according to claim 1,
   wherein the controller controls outputs of the tactile sense presentation and the hearing sense presentation in response to an operation on the input device by the user in a mobile body.

4. A control method, comprising:
   controlling tactile sense presentation for presenting a stimulation through a tactile sense and hearing sense presentation for presenting a stimulation through a hearing sense, when it is determined that an operation has been performed on an input device including a contact area with which an object is brought into contact,
   wherein the controlling further includes controlling displacement indicating a difference from a reference position of the contact area, the displacement being related to the tactile sense presentation, and controlling a strength of sound related to the hearing sense presentation, so that at least one of the tactile sense presentation and the hearing sense presentation is in a proper range that is a range allowing a user of the input device to perceive the presentation and not causing the user to have unpleasant feeling, and
   wherein the proper range is defined by a multivariate analysis using evaluations about the tactile sense presentation and the hearing sense presentation as objective variables and the displacement related to the tactile sense presentation and the strength of sound related to the hearing sense presentation as explanation variables.

5. A non-transitory computer readable storage medium having a program stored therein, the program, causing a computer to achieve:
   a control function that controls tactile sense presentation for presenting a stimulation through a tactile sense and hearing sense presentation for presenting a stimulation through a hearing sense, when it is determined that an operation has been performed on an input device including a contact area with which an object is brought into contact,
   wherein the control function is controlled to control displacement indicating a difference from a reference position of the contact area, the displacement being related to the tactile sense presentation, and to control a strength of sound related to the hearing sense presentation, so that at least one of the tactile sense presentation and the hearing sense presentation is in a proper range that is a range allowing a user of the input device to perceive the presentation and not causing the user to have unpleasant feeling, and
   wherein the proper range is defined by a multivariate analysis using evaluations about the tactile sense presentation and the hearing sense presentation as objective variables and the displacement related to the tactile sense presentation and the strength of sound related to the hearing sense presentation as explanation variables.

* * * * *